(12) United States Patent
Shimizu et al.

(10) Patent No.: US 6,212,452 B1
(45) Date of Patent: Apr. 3, 2001

(54) AUTOMATIC STEERING SYSTEM FOR VEHICLE

(75) Inventors: Yasuo Shimizu; Katsuhiro Sakai, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/143,359

(22) Filed: Aug. 28, 1998

(30) Foreign Application Priority Data

Aug. 29, 1997 (JP) .................................................... 9-234680

(51) Int. Cl.$^7$ ................................. B62D 1/00; B62D 6/00
(52) U.S. Cl. ............................. 701/41; 701/23; 180/168; 180/204; 307/9.1
(58) Field of Search ................................. 701/41, 23, 25, 701/70; 180/168, 204, 6.2, 400, 401, 446; 307/9.1

(56) References Cited

U.S. PATENT DOCUMENTS 5,931,252 * 8/1999 Shimuzu et al. .................... 180/204

FOREIGN PATENT DOCUMENTS 3-74256   3/1991 (JP) .
4-55168   2/1992 (JP) .

* cited by examiner

Primary Examiner—William A Cuchlinski, Jr.
Assistant Examiner—Yonel Beaulieu
(74) Attorney, Agent, or Firm—Arent Fox Kintner Plotkin & Kahn, PLLC

(57) ABSTRACT

An automatic steering system that can detect the steering operations of a driver during an automatic steering control operation in order to reliably discontinue the automatic steering control operation. The automatic steering control operation is discontinued if the driver spontaneously carries out a steering operation during an automatic steering control operation and if a steering torque equals to or is larger than a reference steering torque. When the steering torque equals to or is larger than the reference steering torque for at least a predetermined time, the automatic steering control operation is discontinued. Interruptions to the automatic operation by an instantaneous increase in steering torque due to a factor other than the steering operation provided by the driver, such as noise, can be eliminated. Furthermore, the reference steering torque or the predetermined time is changed in accordance with the frequency of an input steering torque, the vehicle speed, the steering angular speed, or the steering angular acceleration or the locus of movement of the vehicle.

17 Claims, 7 Drawing Sheets

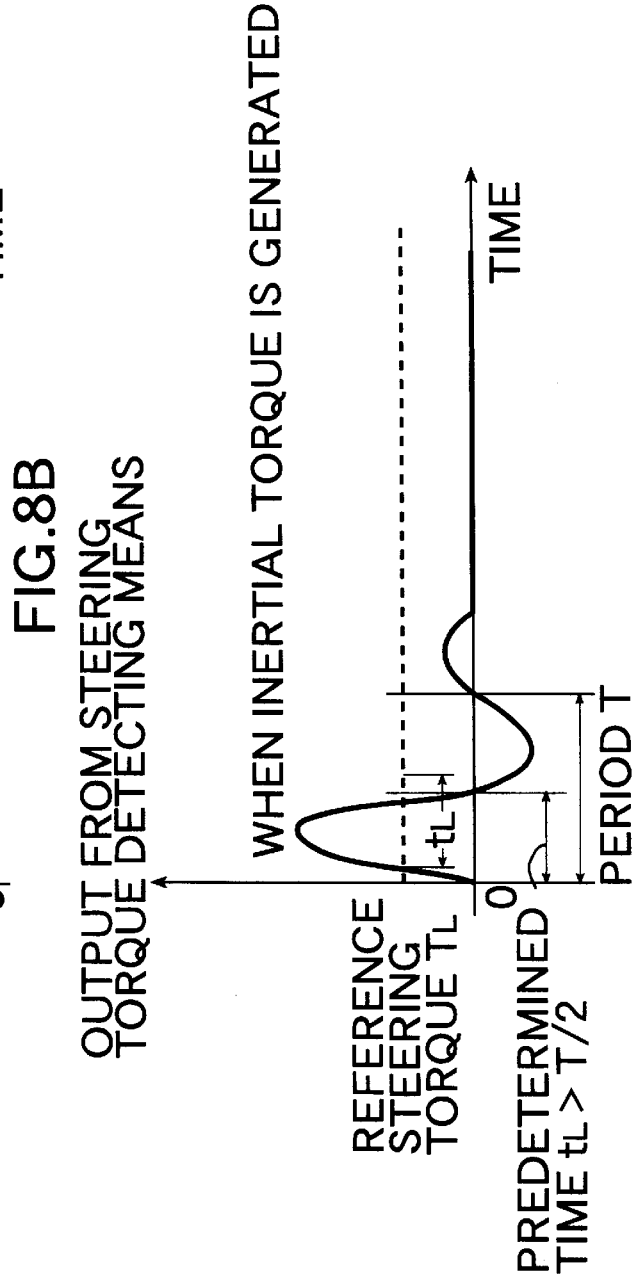

AUTOMATIC STEERING SYSTEM FOR VEHICLE

BACKGROUND OF THE INVENTION

1. Field of the Invention

The present invention relates to an automatic steering system for a vehicle, for automatically parking the vehicle without recourse to a steering operation by a driver.

2. Description of the Prior Art

Automatic steering systems for vehicles are already known from Japanese Patent Application Laid-open Nos. 3-74256 and 4-55168 and the like. The automatic steering systems for vehicles utilize an actuator for a conventionally well-known electric power steering device, and are designed so that back parking and linear parking are automatically controlled by controlling the actuator based on the relationship between a distance of movement of the vehicle and a steering angle that has been previously stored.

In the known automatic steering system, when a driver operates a steering wheel during an automatic steering control operation and it is determined that the steering torque exceeds a previously set reference steering torque, the automatic steering control operation is discontinued.

However, there is a problem that if the determination is carried out only by comparing an output from a steering torque detecting means with the reference steering torque, the output from the steering torque detecting means may temporarily exceed the reference steering torque due to noise in the steering torque detecting means, or due to an inertial torque of the steering wheel when a tire contacts a bump in the road or a curb, or when an automatic steering operation is carried out through the actuator, and at each time, the automatic steering operation is discontinued. If the reference steering torque is set at a higher value in order to avoid such a disadvantage, there is a possibility that the automatic steering operation and the manual steering operation may interfere with each other to give a sense of incompatibility to the driver, and if the driver operates the steering wheel during the automatic steering control operation, the automatic steering control operation may not immediately be discontinued.

SUMMARY OF THE INVENTION

The present invention has been accomplished with the above circumstance in view, and it is an object of the present invention to ensure that the steering operation by the driver during the automatic steering control operation, can be detected to reliably discontinue the automatic steering control operation.

To achieve the above object, there is provided an automatic steering system for a vehicle, comprising a movement locus setting means adapted to store or calculate a locus of movement of the vehicle to a target position, an actuator for steering a wheel of the vehicle, and a control means for controlling the driving of the actuator based on the locus of movement set by the movement locus setting means. The automatic steering system further includes a steering operation detecting means for detecting a steering operation by a driver, so that when the steering operation detecting means detects the steering operation by the driver for at least a predetermined time, the control means discontinues the control of the actuator based on the locus of movement.

With the above arrangement, even if the output from the steering torque detecting means is temporarily increased due to noise or due to an inertial torque generated when a tire contacts a bump in the road or a curb, the control means does not discontinue the control of the actuator based on the locus of movement. Therefore, there is not a possibility that the automatic steering operation will be discontinued against the driver's will. When the driver's steering operation has been carried out, the predetermined time corresponds to a minimum duration which at least exceeds the time and in which a steering torque is detected. The predetermined time is set at 0.1 second in the described embodiment, but can be changed.

In addition, the predetermined time is set larger than one half of an intrinsic period (T) of a steering section. With the above arrangement, the steering torque generated by the driver's steering operation can be discriminated from an inertial torque generated when a tire contacts a bump in the road or a curb.

Further, the locus of movement of the vehicle is set as a steering angle of the wheel with respect to a distance of movement of the vehicle. Thus, even if the traveling speed of the vehicle is varied, a constant locus of movement can be ensured.

The automatic steering system further includes a brake input means operated by the driver, and the driving of the actuator based on the locus of movement, is permitted only when the brake input means is being operated. With the above arrangement, when the vehicle is moved close to an obstacle, the brake input means can be immediately operated to stop the vehicle.

In addition, the steering operation detecting means detects the steering operation by the driver, when a torque inputted to a steering wheel is equal to or larger than a reference steering torque. Thus the influence of noise can be eliminated, whereby the steering operation by the driver can be reliably detected. The reference torque is a value which ensures that the steering torque generated by the driver's steering operation can be discriminated from noise or the like. The reference torque is set at 0.2 kgf-m in the described embodiment, but can be changed.

The predetermined time or the reference steering torque can be changed in accordance with the state of variation in torque inputted to the steering wheel. It is thus possible to reliably determine whether the detected torque is a torque generated by the driver's steering operation, or a torque generated due to any other factor.

The state of variation in torque is a torque variation frequency, and the predetermined time is prolonged or the reference steering torque is increased, in accordance with an increase in the torque variation frequency. In view of the fact that the torque variation frequency is larger, the torque generated due to any factor other than the driver's steering operation, can be discriminated from the torque generated by the driver's steering operation.

The automatic steering system further includes a vehicle speed detecting means for detecting the vehicle speed, and the predetermined time or the reference steering torque is changed in accordance with the vehicle speed. Thus even if an inertial torque generated when a tire contacts a bump in the road, is varied in accordance with the vehicle speed, the predetermined time or the reference steering torque is changed in accordance with the variation. Therefore, the inertial torque can be reliably discriminated from the torque generated by the driver's steering operation.

The predetermined time is prolonged or the reference steering torque is increased, in accordance with an increase in vehicle speed, and in view of the fact that the inertial torque generated when a tire contacts a bump in the road, is larger at a higher vehicle speed, the inertial torque can be further reliably discriminated from the torque generated by the driver's steering operation.

Further, the predetermined time or the reference steering torque is changed in accordance with the state of the steered wheel. Thus, even if the inertial torque generated when a tire contacts a bump in the road, is varied in accordance with the state of the steered wheel, the predetermined time or the reference steering torque is changed in accordance with the variation. Therefore, the inertial torque can be reliably discriminated from the torque generated by the driver's steering operation.

The state of the steered wheel is a steering angular speed or a steering angular acceleration, and the predetermined time is prolonged or the reference steering torque is increased, in accordance with an increase in steering angular speed or in steering angular acceleration. In view of the fact that the inertial torque is increased with an increase in steering angular speed or in steering angular acceleration, the inertial torque can be reliably discriminated from the torque generated by the driver's steering operation.

Further, the predetermined time or the reference steering torque is changed in accordance with the locus of movement set by the movement locus setting means. Thus, even if the inertial torque generated with the automatic steering operation is varied in accordance with the locus of movement of the vehicle, the predetermined time or the reference steering torque is changed in accordance with the variation. Therefore, the inertial torque can be reliably discriminated from the torque generated by the driver's steering operation.

The locus of movement is set as a steering angle of the wheel relative to the distance of movement of the vehicle, and the predetermined time is prolonged or the reference steering torque is increased, at the point of or immediately after a change in the rate of variation in steering angle in the locus of movement. In view of the fact that the inertial torque is increased at the point of or immediately after the change in the rate of variation in steering angle in the locus of movement of the vehicle, the inertial torque can be further reliably discriminated from the torque generated by the driver's steering operation.

BRIEF DESCRIPTION OF THE DRAWINGS

FIGS. 8A and 8B are diagrams for explaining a technique for discriminating the steering torque and the inertial torque from each other.

DETAILED DESCRIPTION OF THE PREFERRED EMBODIMENT

Figure 1:
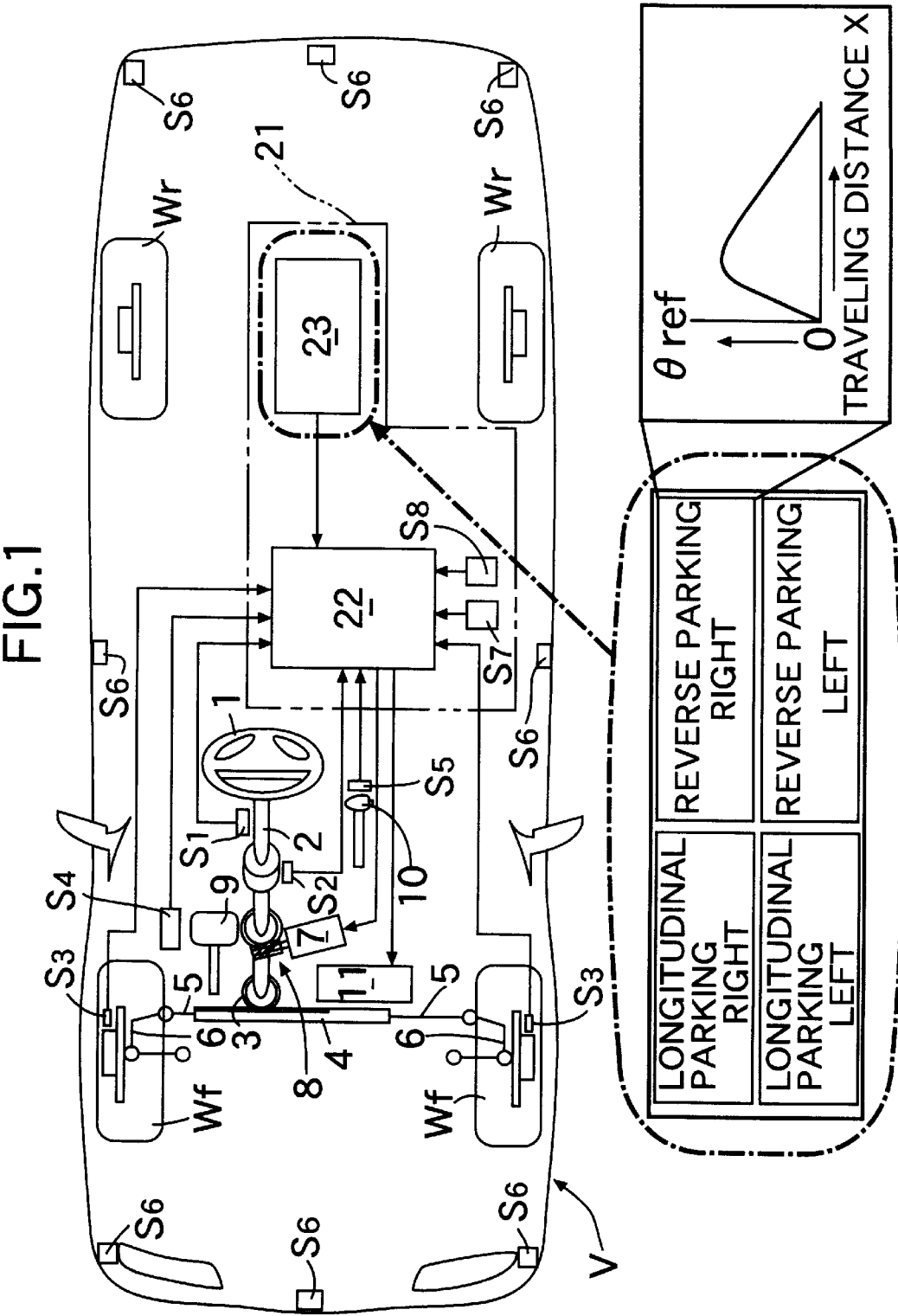
FIG. 1 is a diagram of the entire arrangement of a vehicle provided with a steering control unit according to an embodiment of the present invention.

As shown in FIG. 1, a vehicle V includes a pair of front wheels Wf, Wf and a pair of rear wheels Wr, Wr. A steering wheel 1 and the front wheels Wf, Wf which are the steered wheels, are connected to each other by a steering shaft 2 rotated in unison with the steering wheel 1, a pinion 3 at the lower end of the steering shaft 2, a rack 4 meshed with the pinion 3, left and right tie rods 5 at opposite ends of the rack 4, and left and right knuckles 6 connected to the tie rods 5. A steering actuator 7 comprising an electric motor, is connected to the steering shaft 2 through a worm gear mechanism 8, in order to assist the driver in the operation of the steering wheel 1, or to carry out automatic steering for garaging of the vehicle which will be described hereinafter.

A steering control unit 21 comprises a control section 22 and a storage section 23. Inputted to the control section 22 are signals from a steering angle detecting means $S_1$ for detecting the steering angle θ of the front wheels Wf, Wf based on the rotational angle of the steering wheel 1; a steering torque detecting means $S_2$ as a steering operation detecting means, for detecting the steering torque of the steering wheel 1; front wheel rotational angle detecting means $S_3$, $S_3$ as a vehicle speed detecting means for detecting the rotational angles of the left and right front wheels Wf, Wf; a brake operation-amount detecting means $S_4$ for detecting the amount of operation of a brake pedal 9 as a brake input means; a shift range detecting means $S_5$ for detecting the shift range (a "D" range, an "R" range, an "N" range, a "P" range and the like) selected by a select lever 10; and eight object detecting means $S_6$ mounted at a front portion, a central portion and a rear portion of the vehicle V. The object detecting means $S_6$ may be any known type of detecting means such as sonar, radar, television camera or the like. Lines connecting the eight object detecting means $S_6$ and the control section 22 are not shown for the purpose of avoiding the complication of the drawings. The control section 22 is the control means of the present invention, and the storage section 23 is the movement locus setting means of the present invention.

Figure 3:
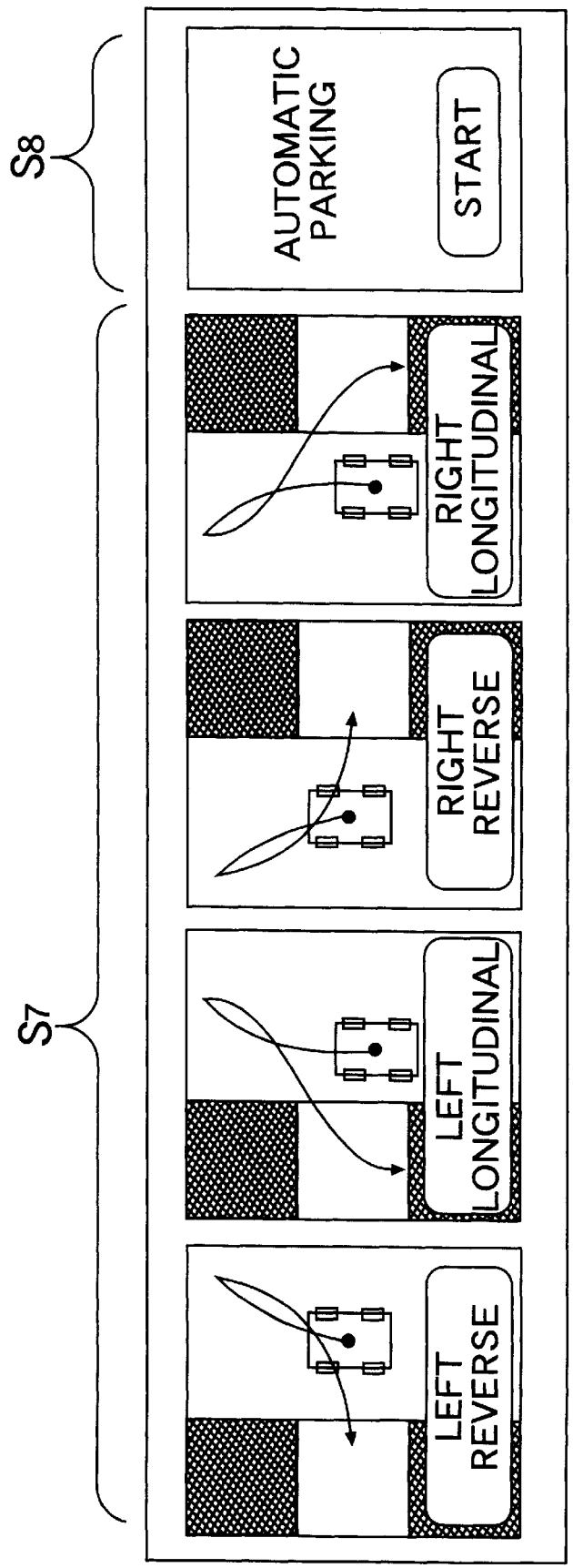
FIG. 3 is an illustration of a mode selecting switch and an automatic parking start switch.

Further, a mode selecting switch $S_7$ and an automatic parking start switch $S_8$ operated by a driver, are connected to the control section 22. As can be seen from FIG. 3, the mode selecting switch $S_7$ is operated to select any of four parking modes: a reverse parking/right mode; a reverse parking/left mode; a longitudinal parking/right mode and a longitudinal parking/left mode. The mode selecting switch $S_7$ includes four switch buttons corresponding to the modes, respectively. The automatic parking start switch $S_8$ is operated to start the automatic parking in any mode selected by the mode selecting switch $S_7$.

Data for the four parking modes, i.e., relationships of reference steering angles θref to traveling distances X of the vehicle V are previously stored as a table in the storage section 23. The traveling distance X of the vehicle V is calculated by multiplying the known peripheral length of the front wheel Wf by the rotational angle of the front wheel Wf, detected by the front wheel rotational-angle detecting means $S_3$, $S_3$. Either one of a high-select value and a low-select value outputted from the pair of left and right front wheel rotational-angle detecting means $S_3$, $S_3$ and an average value of the high-select value and the low-select value, is used for the calculation of the traveling distance X.

The control section 22 controls the operation of the steering actuator 7 and the operation of an operational stage display device 11 including a liquid crystal monitor, a speaker, a lamp, a chime, a buzzer or the like, based on the signals from the detecting means $S_1$ to $S_6$ and the switches $S_7$ and $S_8$, and the data for the parking modes stored in the storage section 23.

The operation of the embodiment of the present invention having the above-described arrangement will be described below.

When the vehicle is in a usual state in which automatic parking is not carried out (when the automatic parking start switch $S_8$ is not in an ON state), the steering control unit 21 functions as a regular power-steering control unit. More specifically, when the steering wheel 1 is operated by the driver to turn the vehicle V, the steering torque detecting means $S_2$ detects the steering torque inputted to the steering wheel 1, and the control section 22 controls the driving of the steering actuator 7 based on the steering torque. As a result, the left and right front wheels Wf, Wf are steered by the driving force from the steering actuator 7, whereby the steering operation by the driver is assisted.

The contents of automatic parking control will be described with the reverse parking/left mode (the mode in which the parking is conducted while the vehicle is being moved backwards to a parking position lying on the left side of the vehicle V) taken as an example.

Figure 2A:
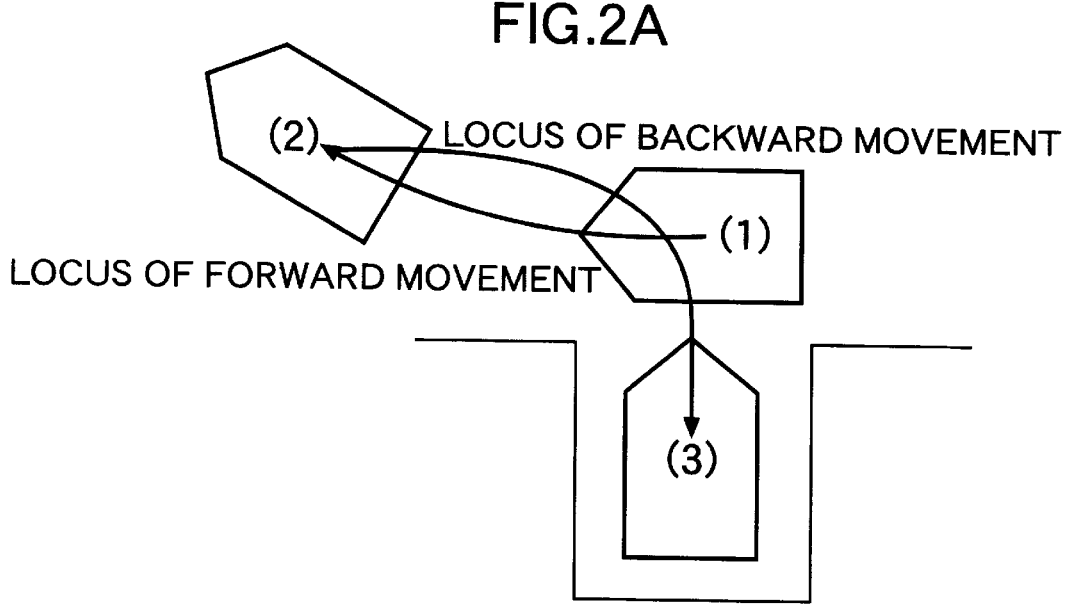
FIGS. 2A and 2B are illustrations explaining the operation in a reverse parking/left mode.

First, as shown in FIG. 2A, the vehicle V is moved to a position in the vicinity of a garage in which the vehicle V is to be parked, and stopped at a position (starting position (1)) in which a predetermined reference (for example, the left-hand side mirror) is aligned with a center line of the garage, with the left side of the vehicle body as close as possible to an entrance line of the garage. Then, when the mode selecting switch $S_7$ is operated to select the reverse parking/left mode, and the automatic parking starting switch $S_8$ is turned on, the automatic parking control operation is started. While the automatic parking control operation is carried out, the actual position of the vehicle, obstacles around the vehicle, a parking position, the predicted locus of movement of the vehicle from the starting position to the parking position, and the reversing position in which the forward movement of the vehicle is changed to the backward movement thereof, are displayed on the operational stage display device 11, and the various instructions and alarms such as the operation of the select lever 10 at the reversing position and the like are given vocally from a speaker to the driver.

When the driver loosens the brake pedal 9 to cause the vehicle V to creep during the automatic parking control operation, the front wheels Wf, Wf are automatically steered by the automatic parking control operation based on the data for the reverse parking/left mode selected by the mode selecting switch $S_7$, even if the driver does not operate the steering wheel 1. Namely, while the vehicle V travels forwards from the starting position (1) to the reversing position (2), the front wheels Wf, Wf are automatically steered to the right, and while the vehicle V travels backwards from the reversing position (2) to a target position (3), the front wheels Wf, Wf are automatically steered to the left.

Figure 2B:
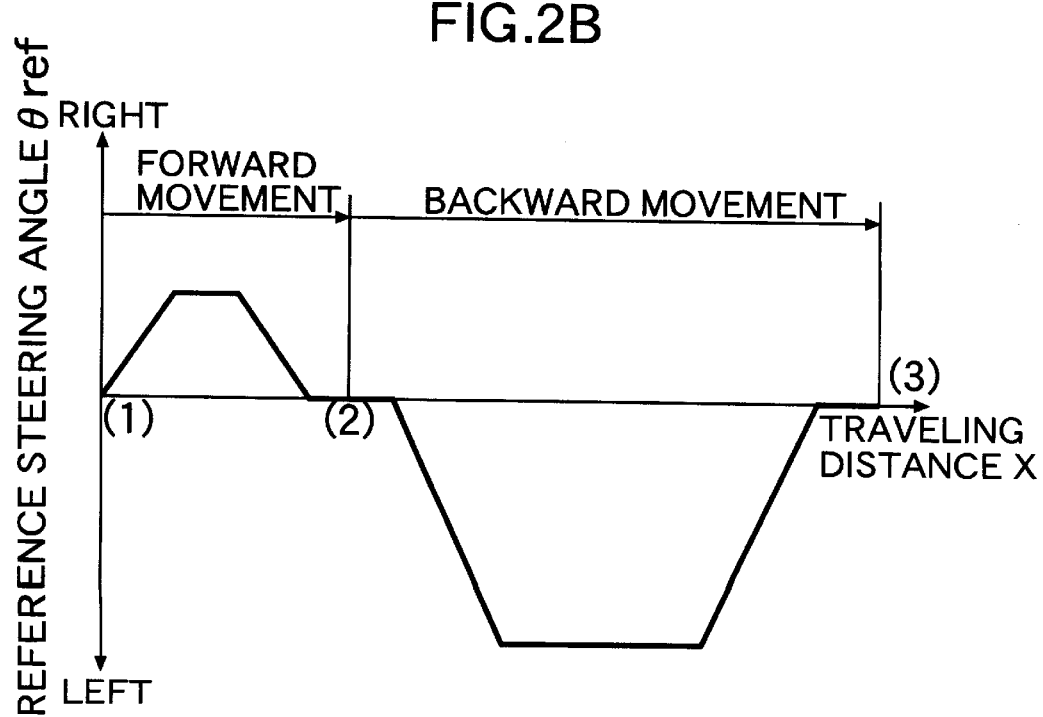

As is clear from FIG. 2B, while the automatic steering operation is carried out, the control section 22 calculates a deviation $E=(\theta ref-\theta)$ on the basis of the reference steering angle $\theta ref$ in the reverse parking/left mode, read from the storage section 23 and the steering angle $\theta$ inputted from the steering angle detecting means $S_1$, and controls the operation of the steering actuator 7 so that the deviation E becomes zero. At this time, the vehicle V is always moved along the above-described locus of movement, even if there is a slight variation in vehicle speed in the creep travel of the vehicle, because the data on the reference steering angle $\theta ref$ is set in correspondence to the distance of movement X of the vehicle V.

The automatic parking control operation is carried out, while the vehicle creeps with the brake pedal 9 depressed by the driver. Therefore, when the driver has found an obstacle, the vehicle can be immediately stopped by the further depressing of the brake pedal 9 by the driver.

The automatic parking control operation is canceled when the driver turns off the mode selecting switch $S_7$. Further, in the following cases (1) to (3) in addition to the above case, the automatic parking control operation is canceled and restored to the usual power-steering control.

(1) When the driver releases his or her foot from the brake pedal 9;
(2) When the driver operates the steering wheel 1; and
(3) When any of the object detecting means $S_6$ detects an obstacle.

The discontinuation of the automatic parking control operation in the case (2) when the driver operates the steering wheel 1, will be further described. As the driver operates the steering wheel when the driver has found an obstacle during the automatic parking control operation, or when the driver decides to change the course, the steering torque detecting means $S_2$ detects the steering torque provided by the driver's steering operation, and the control section 22 discontinues the automatic steering control operation. Thus, it is possible not only to avoid the interference of the automatic steering operation and the steering provided by the driver to immediately keep away from the obstacle, but also to eliminate the need for a special switching operation to discontinue the automatic steering control operation, thereby leading to an enhanced convenience.

The output from the steering torque detecting means $S_2$ does not necessarily indicate the steering torque provided by the driver's steering operation. The output from the steering torque detecting means $S_2$ may be instantaneously increased due to noise in some cases, or due to a pseudo steering torque (which will be referred to as an inertial torque hereinafter) detected due to an inertia of the steering wheel 1, (1) when a shock provided upon contacting a bump in the road or a curb by a tire is transmitted to the steering shaft, (2) when the rotation of the steering wheel 1 is suddenly stopped by the abutment of the end of the rack 4, or (3) when the steering actuator 7 is operated. Therefore, it is required that the steering torque provided by the driver's steering operation and the steering torque provided due to any other factor be discriminated from each other, and only when steering torque provided by the driver's steering operation has been detected, the automatic steering control operation be discontinued.

For this reason, when a torque equal to or larger than a reference steering torque $|T_L|$ (an absolute value) as a basic necessary condition for determining the driver's steering operation, has been detected for at least a predetermined time $t_L$ by the steering torque detecting means $S_2$, it is determined that the driver's steering operation has been carried out.

This will be further described below. The input of the steering operation by the driver is generally a step input and hence, the output from the steering torque detecting means $S_2$ is a step response as shown in FIG. 8A. However, an inertial torque generated by a shock provided upon contacting a bump in the road or a curb by the tire or a shock provided upon sudden stopping of the rotation of the steering wheel 1 due to abutment of the end of the rack 4, is an instantaneous impulse input and hence, the output from the steering torque detecting means $S_2$ is an impulse response as shown in FIG. 8B. The period T of the impulse response is determined by the intrisical characteristics of vibrating of a steering section and hence, if the predetermined time $t_L$ is set at $t_L > T/2$, the inertial torque cannot exceed the reference steering torque $|T_L|$ over a time longer than the predetermined time $t_L$. Therefore, when the output from the steering torque detecting means $S_2$ continuously exceeds the reference steering torque $|T_L|$ for at least the predetermined time $t_L$, such torque can be judged to be a steering torque provided by the driver's steering torque.

Thus, a very small torque and an instantaneous torque such as noise due to a factor other than the driver's steering torque are excluded, whereby a precise determination can be made. The basic value $T_{L0}$ of the reference steering torque $|T_L|$ is set at 0.2 kgf-m in the described embodiment, but may be changed depending upon various conditions which will be described hereinafter. The predetermined time $t_L$ is set at 0.1 sec in the described embodiment.

The reference steering torque $|T_L|$ is changed in accordance with the input frequency fr of the steering torque, the vehicle speed v, the steering angular speed $d\theta/dt$ or the steering angular acceleration $d\theta^2/dt^2$, or the locus of movement of the vehicle V. These changes will be sequentially described below.

(1) Change in Accordance With the Input Frequency fr of the Steering Torque

Figure 4:
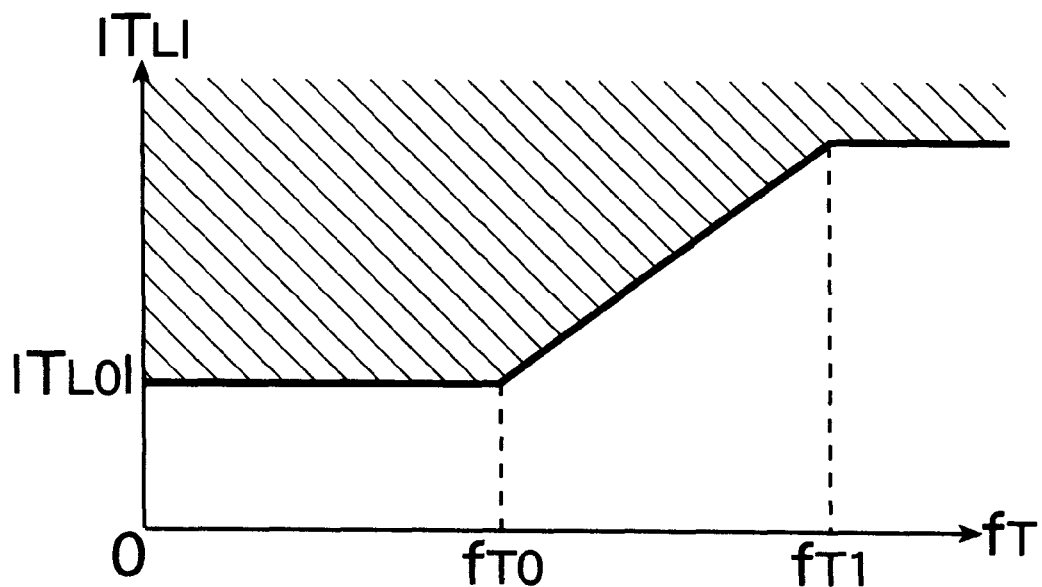
FIG. 4 is a graph showing the relationship between the frequency of an input steering torque and the reference steering torque.

The input frequency fr of the steering torque, when the driver manually operates the steering wheel 1, has an upper limit of, for example, about 3 Hz, which is defined as a first reference frequency $f_{T0}$. $1/t_L$ which is the inverse of the predetermined time $t_L$ is defined as a second frequency $f_{T1}$. As shown in FIG. 4, the reference steering torque $|T_L|$ for determining the steering operation is set at a basis value $|T_{L0}|$ in a first range of input frequency $f_T$ of the steering torque which is smaller than a first reference frequency $f_{T0}$; is linearly increased with an increase in input frequency $f_T$ in a second range which is equal to or larger than the first reference frequency $f_{T0}$ and smaller than a second reference frequency $f_{T1}$ and is maintained at a given value in a third range which is equal to or larger than the second reference frequency $f_{T1}$.

This means that in the first range of the input frequency $f_T$ of the steering torque which is smaller than the first reference frequency $f_{T0}$, there is a higher possibility that the steering torque is provided by the driver's steering operation and hence, the basic value $|T_{L0}|$ is set at the reference steering torque $|T_L|$ as it is. In the second range of the input frequency $f_T$ of the steering torque which is equal to or larger than the first reference frequency $f_{T0}$, there is an increased possibility that the steering torque is provided by a factor other than the driver's steering operation. Therefore, the steering torque provided by the other factor is prevented from being mis-determined as a steering torque provided by the driver's steering operation, by the fact that the reference steering torque $|T_L|$ is increased correspondingly. In a third range of the input frequency $f_T$ of the steering torque which is equal to or larger than the second reference steering torque $f_{T1}=(1/t_L)$, the duration of the steering torque is necessarily equal to or smaller than the predetermined time $t_L$ and for this reason, it cannot be determined that the driver's steering operation has been carried out in the third range. Therefore, the reference steering torque $|T_L|$ may be set at any value in the third range, but is set at a given value, as shown for example in FIG. 4. It should be noted that an obliquely lined region in FIG. 4 indicates a range of the steering torque provided by the driver's steering operation.

(2) Change in Accordance With the Vehicle Speed v

Figure 5:
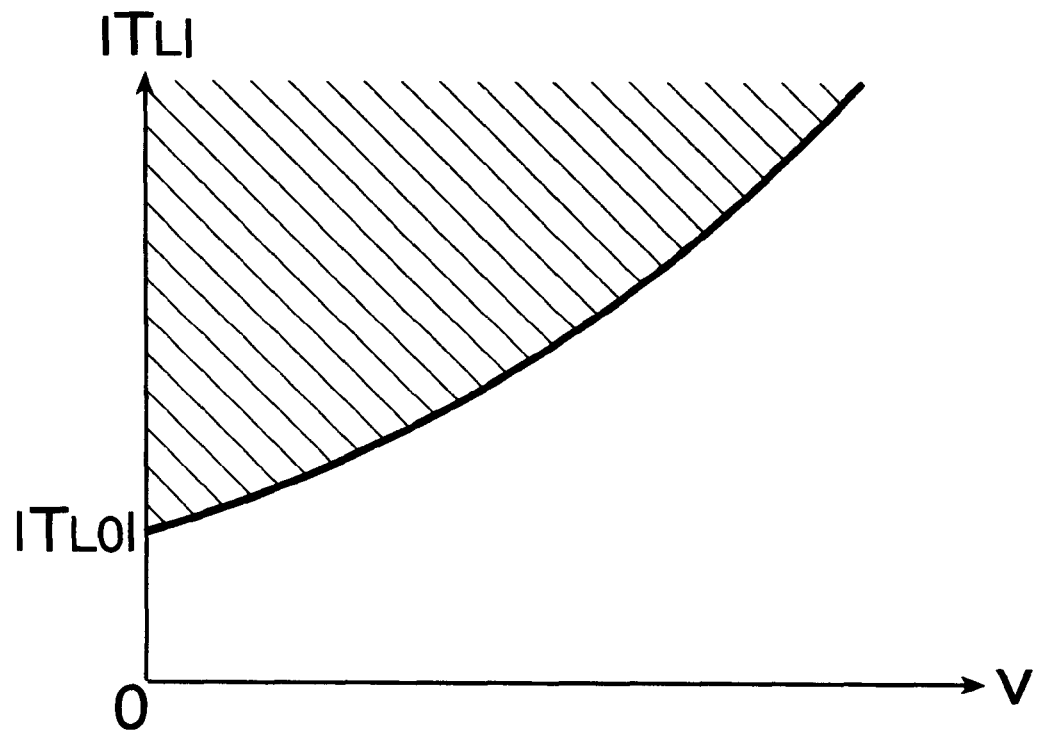
FIG. 5 is a graph showing the relationship between the vehicle speed and the reference steering torque.

When the front wheels Wf, Wf contact a bump in the road or a curb, the generated inertial torque is liable to be larger as the vehicle speed is larger. When the steering actuator 7 is controlled on the basis of the previously stored locus of movement to steer the front wheels Wf, Wf, it is more necessary to carry out a steep steering operation, as when the vehicle speed v is increased, in order to allow the vehicle to be moved on a constant locus of movement. Therefore, if the reference steering torque $|T_L|$ is set so that it is increased to describe a parabola from the basis value $|T_{L0}|$ with an increase in vehicle speed v, as shown in FIG. 5, the inertial torque generated when the vehicle speed v is higher, can be prevented from being misdetermined as a steering torque provided by the driver's steering operation. The obliquely lined region in FIG. 5 indicates a range of the steering torque provided by the driver's steering operation.

Figure 6A:
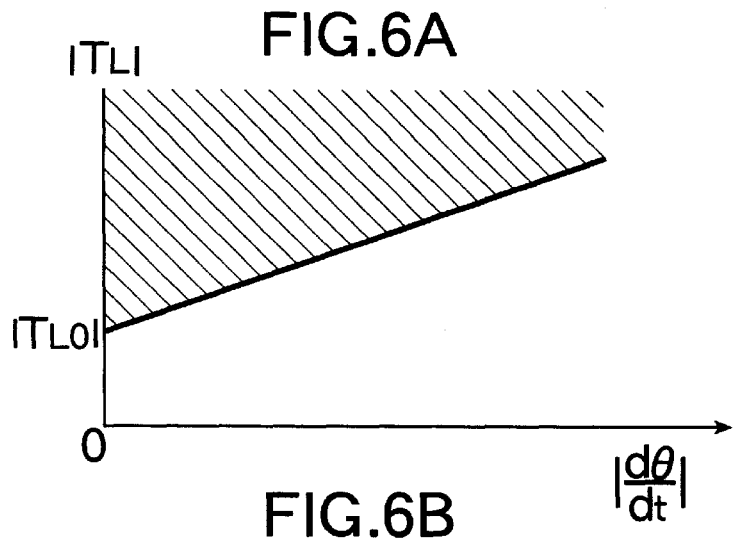
FIGS. 6A, 6B and 6C are graphs showing the relationship between the steering angular speed or the steering angular acceleration and the reference steering torque.
Figure 6B:
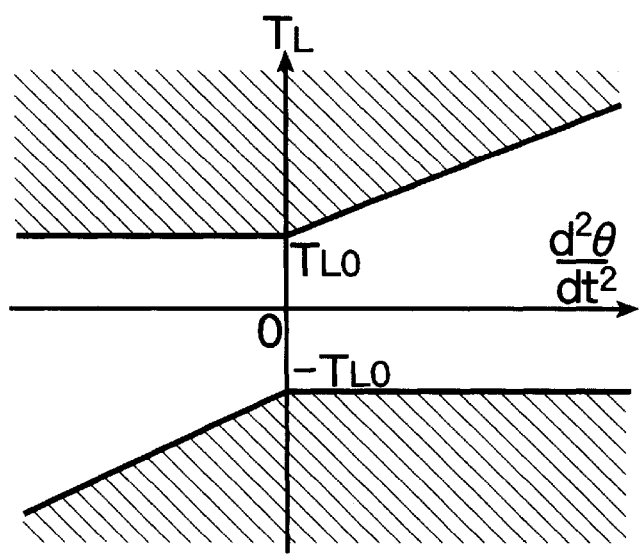
Figure 6C:
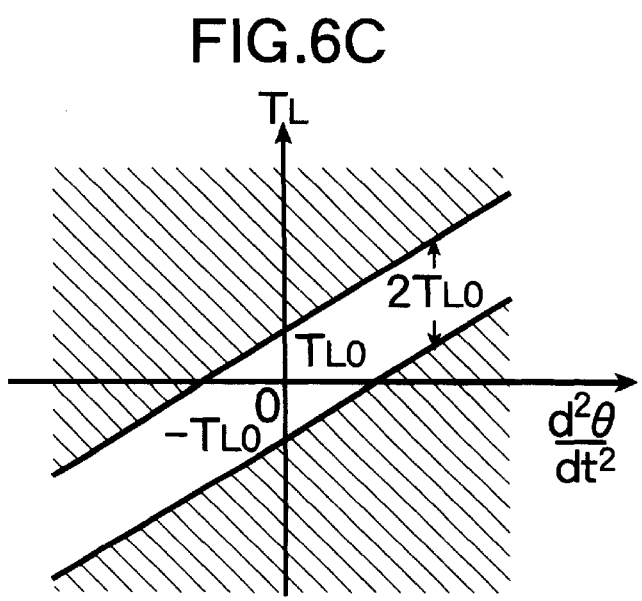

(3) Change in Accordance With the Steering Angular Speed $d\theta/dt$ or the steering angular acceleration $d^2\theta/dt^2$ If the steered state of the front wheels Wf, Wf, i.e., the steering angular speed $d\theta/dt$ or the steering angular acceleration $d^2\theta/dt^2$ are changed, the inertial torque detected is also changed in accordance with such change of the steering angular speed $d\theta/dt$ or the steering angular acceleration $d^2\theta/dt^2$. For example, when the front wheels Wf, Wf contact a bump in the road or a curb in a state in which the steering angular speed $d\theta/dt$ is relatively large, the shock produced at that time is increased, whereby the inertial torque is also increased. The larger steering angular acceleration $d^2\theta/dt^2$ is nothing less than the fact that the detected inertial torque is larger. Therefore, if the reference steering torque $|T_L|$ is set so that it is linearly increased from the basic value $|T_{L0}|$ with an increase in steering angular speed $|d\theta/dt|$ (absolute value), as shown in FIG. 6A, it is possible to prevent the inertial torque generated by the steering actuator 7 when the steering angular speed $|d\theta/dt|$ is higher, from being mis-determined as a steering torque provided by the driver's steering operation. Because the direction (positive or negative) of the inertial torque is known from the direction (positive or negative) of the steering angular acceleration $d^2\theta/dt^2$, the reference steering torque $T_L$ can be linearly increased in the direction of generation of the reference steering torque $T_L$, and defined as $T_{L0}$ or $-T_{L0}$ (a given value) in the opposite direction, as shown in FIG. 6B. Alternatively, by presuming the inertial torque as Å $T_{L0}$, as shown in FIG. 6C, it is possible to not only prevent the inertial torque from being mis-determined as a steering torque provided by the driver's steering operation, but also to reliably judge the steering provided by the driver. The obliquely lined regions in FIGS. 6A–6C indicate a range of the steering torque provided by the driver's steering operation.

(4) Change in Accordance With the Locus of Movement of the Vehicle V

Figure 7A:
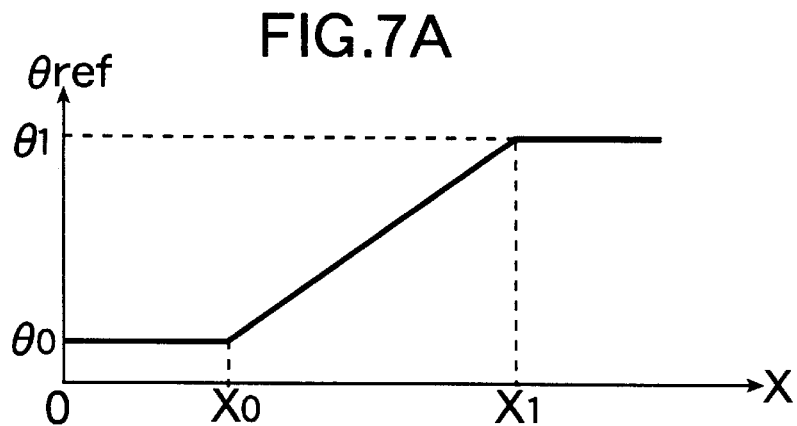
FIGS. 7A, 7B, 7C and 7D are graphs showing the relationship between the locus of movement of the vehicle and the reference steering torque.
Figure 7B:
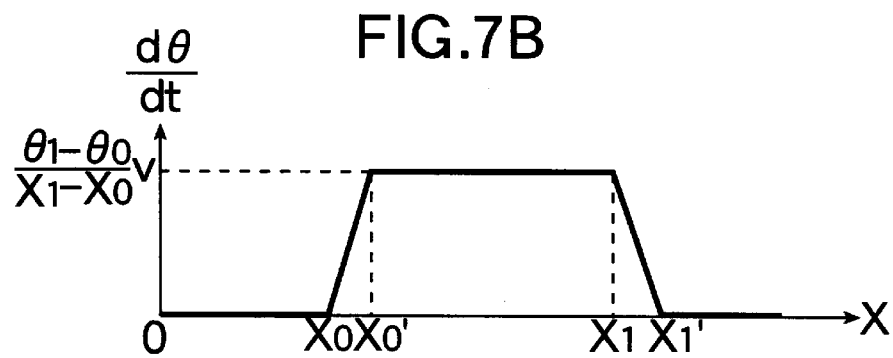

When the relationship of the reference steering angle θref relative to the distance of movement X of the vehicle, for example, as shown in FIG. 7A, is stored in the storage section 23, if the vehicle is being moved at a given vehicle speed v, a steering angle acceleration $d^2\theta/dt^2$ is generated at a position $X_0$ and a position $X_1$ (see FIG. 7C), and the steering angular speed $d\theta/dt$ is generated between the positions $X_0$ and $X_1$ (see FIG. 7B). In this way, the positions in which the steering angular speed $d\theta/dt$ and the steering angular acceleration $d^2\theta/dt^2$ are generated, can be previously known from the contents of the storage section 23. Therefore, it is possible to change the reference steering torque $|T_L|$ from $|T_{L0}|$ to $|T_{L1}|$ or $|T_{L2}|$ in a manner shown in FIG. 7D, on the basis of the description in item (3), and to prevent the inertial torque from being mis-determined as a steering torque by the driver.

Figure 7C:
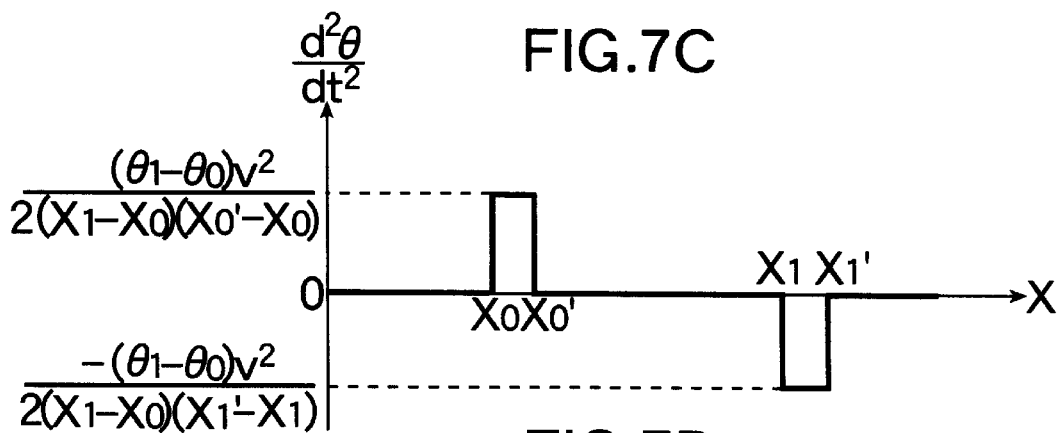
Figure 7D:
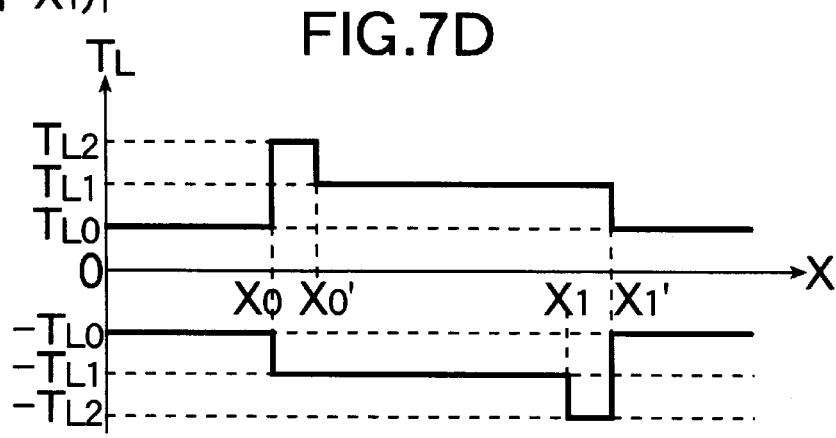

As is apparent from FIGS. 7B and 7C, the steering angular speed $d\theta/dt$ and the steering angular acceleration $d^2\theta/dt^2$ are proportional to the vehicle speed v, respectively and hence, if $|T_{L1}|$ and $|T_{L2}|$ are changed in accordance with the steering angular speed $d\theta/dt$ and the steering angular acceleration $d^2\theta2/dt^2$, it is further effective.

The locus of movement of the vehicle V to the target position is previously stored in the storage section 23 in the described embodiment, but can be calculated from the current position of the vehicle V and the target position. The reference steering torque $|T_L|$ is changed in the increasing direction in each of the cases (1) to (4) in the described embodiment, but even if the predetermined time $t_L$ is changed in the increasing direction in place of the changing of the reference steering torque $|T_L|$ or in addition to the changing of the reference steering torque $|T_L|$, a similar operation and effect can be obtained.

As discussed above, when the steering operation detecting means has detected the steering operation by a driver for at least a predetermined time, the control means discontinues the control of the actuator based on the set locus of movement of the vehicle. Therefore, even if the output from the steering torque detecting means is temporarily increased due to noise or due to an inertial torque generated when a tire contacts a bump in the road, there is not a possibility that the automatic steering operation is discontinued against a driver's will.

The predetermined time is set larger than one half of the intrinsic period of the steering section. Therefore, the steering torque generated by the driver's steering operation can be reliably discriminated from the inertial torque generated when the tire contacts a bump in the road.

The locus of movement of the vehicle is set as the steering angle of the wheel relative to the distance of movement of the vehicle. Therefore, even if the traveling speed of the vehicle is varied, a constant locus of movement can be ensured.

The automatic steering system further includes a brake input means operated by the driver, and the driving of the actuator based on the locus of movement is permitted on the condition that the brake input means is being operated. Therefore, when the vehicle is moved to a point closer to an obstacle, the brake input means can be operated immediately to stop the vehicle.

The steering operation detecting means detects the steering operation by the driver, when the torque inputted to the steering wheel is equal to or larger than the reference steering torque. Therefore, the influence of noise can be eliminated, whereby the steering operation by the driver can be reliably detected.

The predetermined time or the reference steering torque is changed in accordance with the state of variation in torque inputted to the steering wheel. Therefore, it is possible to reliably determine whether the detected torque is a torque generated by the driver's steering operation, or a torque generated due to any other factor.

The state of variation in the torque is a torque variation frequency, and the predetermined time is prolonged or the reference steering torque is increased, in accordance with an increase in the torque variation frequency. Therefore, in view of the fact that the torque variation frequency is larger, the torque generated due to any factor other than the driver's steering operation can be discriminated from the torque generated by the driver's steering operation.

The automatic steering system further includes a vehicle speed detecting means for detecting the vehicle speed, and the predetermined time or the reference steering torque is changed in accordance with the vehicle speed. Therefore, even if the inertial torque generated when a tire contacts a bump in the road or a curb, is varied in accordance with the vehicle speed, the inertial torque can be reliably discriminated from the torque generated by the driver's steering operation.

The predetermined time is prolonged or the reference steering torque is increased, in accordance with an increase in vehicle speed. Therefore, in view of the fact that the inertial torque generated when the tire contacts a bump in the road or a curb, is larger at a higher vehicle speed, the inertial torque can be further reliably discriminated from the torque generated by the driver's steering operation.

The predetermined time or the reference steering torque is changed in accordance with the state of the steered wheel. Therefore, even if the inertial torque generated when a tire contacts a bump in the road or a curb is varied in accordance with the state of the steered wheel, the inertial torque can be reliably discriminated from the torque generated by the driver's steering operation.

The state of the steered wheel is a steering angular speed or a steering angular acceleration, and the predetermined time is prolonged or the reference steering torque is increased, in accordance with an increase in the steering angular speed or in the steering angular acceleration. Therefore, in view of the fact that the inertial torque is increased with an increase in the steering angular speed or in the steering angular acceleration, the inertial torque can be further reliably discriminated from the torque generated by the driver's steering operation.

The predetermined time or the reference steering torque is changed in accordance with the locus of movement set by the movement locus setting means. Therefore, even if the inertial torque generated with the automatic steering operation is varied in accordance with the locus of movement of a vehicle, the inertial torque can be reliably discriminated from the torque generated by the driver's steering operation.

The locus of movement is set as a steering angle of the wheel relative to the distance of movement of the vehicle, and the predetermined time is prolonged or the reference steering torque is increased, at the point of or immediately after a change in the rate of variation in the steering angle in the locus of movement. Therefore, in view of the fact that the inertial torque is increased at the point of or immediately after the change in the rate of variation in the steering angle in the locus of movement, the inertial torque can be further reliably discriminated from the torque generated by the driver's steering operation.

Although the embodiment of the present invention has been described in detail, it will be understood that the present invention is not limited to the above-described embodiment, and various modifications in design may be made without departing from the subject matter of the present invention.

What is claimed is:

1. An automatic steering system for a vehicle, comprising
    a movement locus setting means for setting a locus of movement of the vehicle to a target position,
    an actuator for steering at least one wheel of the vehicle, and
    a control means for controlling the driving of said actuator based on the locus of movement set by said movement locus setting means, and
    a steering operation detecting means for detecting the steering operation by a driver, wherein when said steering operation detecting means detects a steering operation for at least a predetermined time, said steering operation detecting means determines that the steering operation is by the driver and said control means discontinues the control of said actuator based on said locus of movement.

2. An automatic steering system for a vehicle according to claim 1, wherein said movement locus setting means stores a plurality of locus of movements and said movement locus setting means selects one of said stored locus of movements for setting said locus of movement.

3. An automatic steering system for a vehicle according to claim 1, wherein said movement locus setting means calculates said set locus of movement.

4. An automatic steering system for a vehicle according to claim 1, wherein said predetermined time is set larger than one half of an intrinsic period of a steering section.

5. An automatic steering system for a vehicle according to claim 1 or 4, wherein the locus of movement of the vehicle is set as a steering angle of the wheel with respect to a distance of movement of the vehicle.

6. An automatic steering system for a vehicle according to claim 1 or 4, further including a brake input means operated by the driver, and wherein the driving of said actuator based on said locus of movement, is permitted only when said brake input means is being operated.

7. An automatic steering system for a vehicle according to claim 1 or 4, wherein said steering operation detecting means detects the steering operation is that of the driver, when a torque inputted to the steering wheel of the vehicle is equal to or larger than a reference steering torque.

8. An automatic steering system for a vehicle according to claim 7, wherein said predetermined time or said reference steering torque is changed in accordance with the variation in torque inputted to said steering wheel.

9. An automatic steering system for a vehicle according to claim 8, wherein said variation in torque has a torque variation frequency, and said predetermined time is prolonged or said reference steering torque is increased, in accordance with an increase in said torque variation frequency.

10. An automatic steering system for a vehicle according to claim 7, further including a vehicle speed detecting means for detecting the vehicle speed, and wherein said predetermined time or said reference steering torque is changed in accordance with said vehicle speed.

11. An automatic steering system for a vehicle according to claim 10, wherein said predetermined time is prolonged or said reference steering torque is increased, in accordance with an increase in the vehicle speed.

12. An automatic steering system for a vehicle according to claim 7, wherein said predetermined time or said reference steering torque is changed in accordance with the state of the steered wheel.

13. An automatic steering system for a vehicle according to claim 12, wherein said state of the steered wheel is a steering angular speed and said predetermined time is prolonged or said reference steering torque is increased, in accordance with an increase in said steering angular speed.

14. An automatic steering system for a vehicle according to claim 12, wherein said state of the steered wheel is a steering angular acceleration and said predetermined time is prolonged or said reference steering torque is increased, in accordance with an increase in said steering angular acceleration.

15. An automatic steering system for a vehicle according to claim 7, wherein said predetermined time or said reference steering torque is changed in accordance with the locus of movement set by said movement locus setting means.

16. An automatic steering system for a vehicle according to claim 15, wherein said locus of movement is set as the steering angle of the wheel relative to the distance of movement of the vehicle, and said predetermined time is prolonged or said reference steering torque is increased, at a point of change in the rate of variation in the steering angle in said locus of movement.

17. An automatic steering system for a vehicle according to claim 15, wherein said locus of movement is set as the steering angle of the wheel relative to the distance of movement of the vehicle, and said predetermined time is prolonged or said reference steering torque is increased, at a point after the change in the rate of variation in the steering angle in the locus of movement.

* * * * *